UNITED STATES PATENT OFFICE.

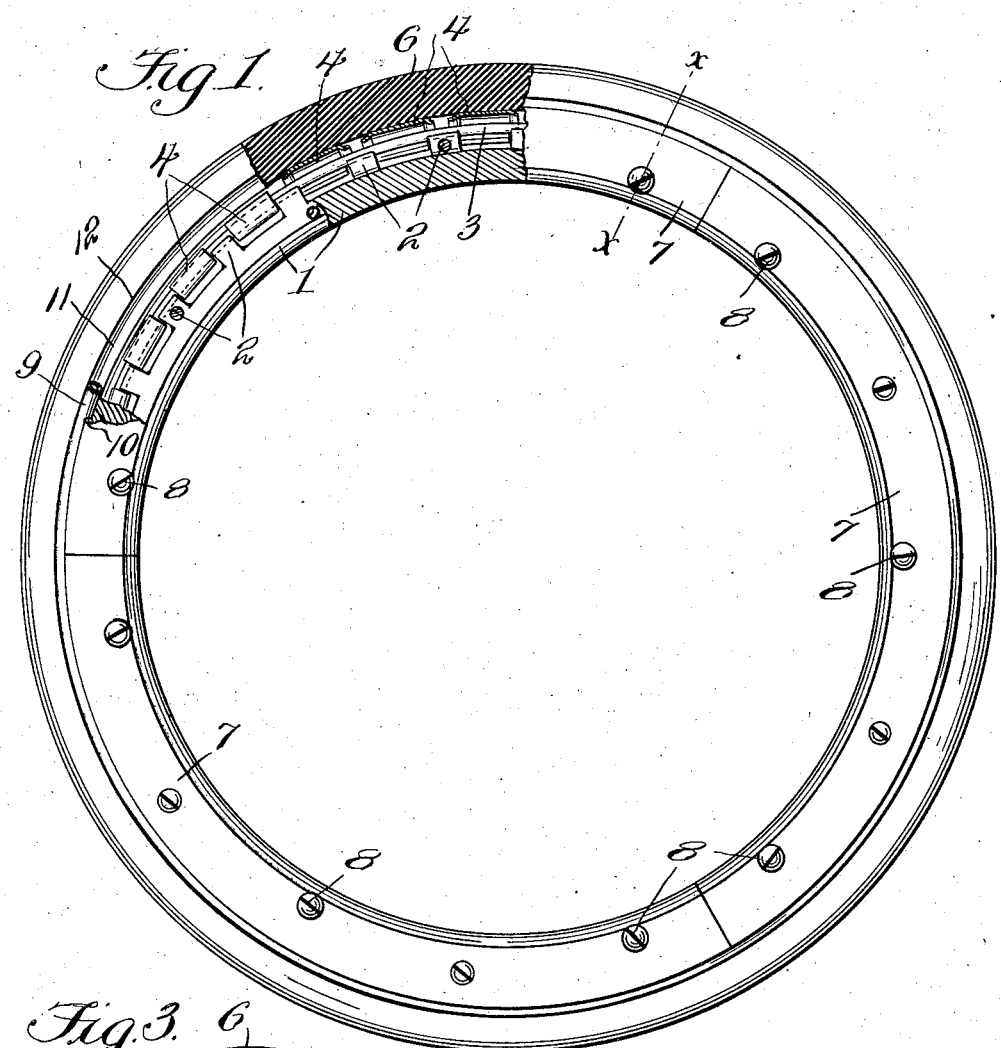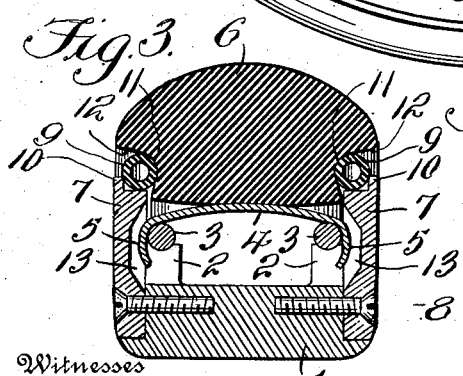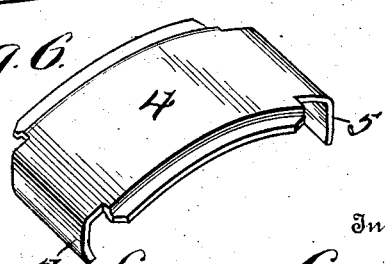

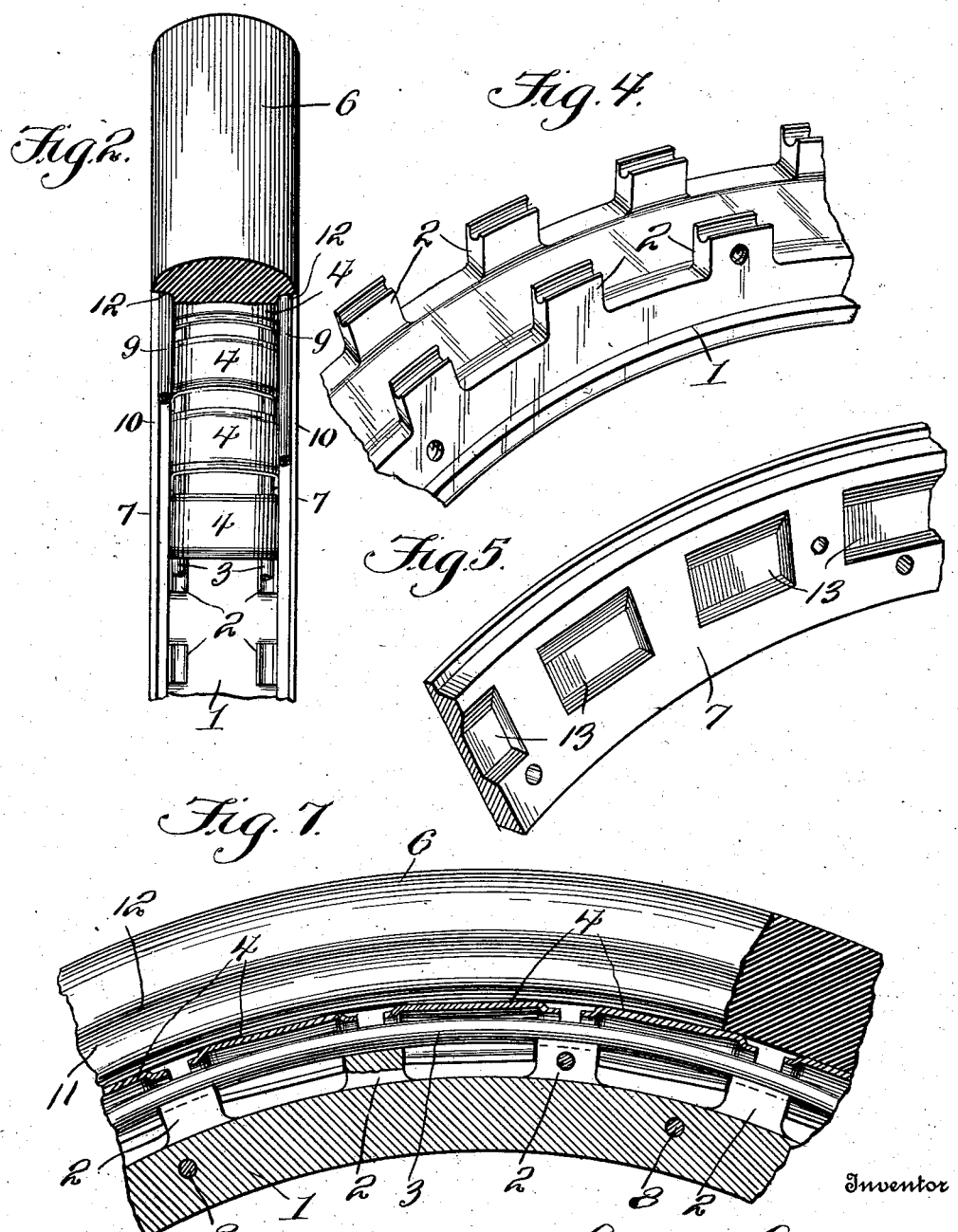

GEORGE GRAY, OF SISSETON, SOUTH DAKOTA.

TIRE.

1,027,247. Specification of Letters Patent. Patented May 21, 1912.

Application filed October 28, 1911. Serial No. 657,221.

*To all whom it may concern:*

Be it known that I, GEORGE GRAY, a citizen of the United States, residing at Sisseton, in the county of Roberts and State of South Dakota, have invented new and useful Improvements in Tires, of which the following is a specification.

The invention provides a yieldable tire for vehicles generally and more particularly for automobiles, the purpose being a construction enabling a solid tire being used so as to relieve shock and vibration and attain practically all the advantages resulting from the use of pneumatic tires without being liable to puncture which is the chief source of annoyance in the use of tires of the pneumatic type.

The invention provides a tire which may be fitted to any style or make of wheel, said tire embodying rim and tread portions, the rim forming a support for the tread portion of the tire and the adjunctive parts.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a tire embodying the invention, parts being broken away. Fig. 2 is an edge view of a portion of the tire, parts being broken away. Fig. 3 is a section on the line $x$—$x$ of Fig. 1. Fig. 4 is a detail perspective view of part of the rim portion of the tire. Fig. 5 is a detail view in perspective of a portion of one of the side rings. Fig. 6 is a detail view of one of the springs. Fig. 7 is a sectional view of a portion of the tire in the plane thereof, showing the parts on a larger scale.

Corresponding and like parts are referred to in the following description, and indicated in all the views of the drawings, by the same reference characters.

The tire comprises a rim or band 1 which is adapted to encircle the rim or felly of the wheel to be equipped with the tire. The rim or band 1 may be formed in any manner and is usually cast in sections, the number of sections depending upon the diameter of the tire. Studs 2 are located at regular intervals in the circumferential length of the rim or band 1, said studs being located at or near the edges of the rim and serving as supports for rings 3, which latter may be of steel or wrought iron and shrunk upon the outer ends of the studs. To prevent lateral displacement of the rings 3 the outer ends or edges of the studs 2 are made hollow to form seats in which the rings 3 are fitted. Flat springs 4 are arranged about the rim and are supported at their ends by means of the rings 3, the ends of the springs being bent to form hooks 5 which engage the said rings 3 between the studs 2. The springs 4 are spaced apart and their hooked ends are notched to receive edge portions of the studs 2, the latter serving to hold the springs spaced apart the required distance. The springs 4 are spaced from the rim 1 and are constructed of spring metal of suitable gage depending upon the load to be carried by the tire so as to insure a tire possessing sufficient resiliency to neutralize shock and vibration but yet prevent overstraining of the springs. The springs 4 provide a yieldable bed or seat for the tread 6, which consists of a solid strip of rubber molded or otherwise formed into the shape substantially as indicated in the sectional views.

Side rings 7 are bolted or otherwise secured to the sides of the rim or band 1 and close the space formed between the said rim 1 and the springs 4. The rings 7 may be formed of sections which preferably are arranged to break joint with the sections of the rim 1, the several parts being connected by bolts 8, which pass through registering openings in the rim 1 and rings 7. The rings 7 project beyond the rings 3 and springs 4 and support fillers 9, which consist of rings of tubing fitted upon the outer edges of the rings 7 and which are confined between flanges 10 at the outer sides of the rings 7 and shoulders 11 near the edges of the tread 6 formed by having said edges rabbeted, the projecting parts 12 overhanging the fillers 9. The fillers 9 serve to prevent moisture, dust and other foreign matter from entering the space formed between the rim 1 and the springs 4. These fillers also lend resiliency to the tire as a whole and reinforce the edge portions of the tread 6 besides protecting the outer edges of the rims 7. Recesses 13 are formed in the inner faces of the rings 7 opposite the hooked ends 5 of the springs 4 to provide clearance for the hooks 5 and enable play thereof as the springs are subjected to pressure and relieved from said pressure. The stops formed by the shoulders at the ends of the recesses 13 engage the ends of the hooks 5 and serve in a measure to hold the springs properly spaced. The spaces formed between the springs 4 admit of portions of the tread 6 entering said spaces and engaging with the edges of the springs 4, thereby preventing turning of the tread upon the rim, particularly when the tire is applied to the rear or drive wheel of an automobile.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a tire of the character described a rim provided at its edges with studs having their outer ends circumferentially grooved, rings seated within said grooves, transverse springs having hooked ends which engage the rings at points between the studs, end portions of the hooks being cut away to provide clearance for the studs, side rings secured to opposite edges of the rim and extending beyond the springs and having recesses in their inner faces opposite the hooked ends of the springs, a yieldable tread mounted upon the springs and having edge portions overlapping the side rings, and fillers of yieldable material mounted upon the side rings and underlapping the projecting edge portions of the tread.

In testimony whereof I affix my signature in presence of two witnesses.

GEORGE GRAY.

Witnesses:
J. J. BATTERTON,
C. CLINTON COVAL.

---

Copies of this patent may be obtained for five cents each, by addressing the "Commissioner of Patents, Washington, D. C."